United States Patent [19]

Berestecki

[11] 4,438,626
[45] Mar. 27, 1984

[54] APPARATUS FOR ATTACHING A CERAMIC MEMBER TO A METAL STRUCTURE

[75] Inventor: Stephen B. Berestecki, Lynnfield, Mass.

[73] Assignee: General Electric Company, Lynn, Mass.

[21] Appl. No.: 301,172

[22] Filed: Sep. 11, 1981

[51] Int. Cl.³ .............................................. F02C 7/20
[52] U.S. Cl. .................................... 60/39.32; 60/749; 60/753
[58] Field of Search ..................... 60/39.31, 39.32, 261, 60/749, 753; 415/214; 403/29, 179, 404; 411/516, 520, 521, 60, 61

[56] References Cited

U.S. PATENT DOCUMENTS

| | | | |
|---|---|---|---|
| 2,625,788 | 1/1953 | Neikirk et al. | 60/270 R |
| 2,799,991 | 7/1957 | Conrad | 60/749 |
| 3,136,202 | 6/1964 | Wagner | 411/60 |
| 3,269,116 | 8/1966 | Frasca et al. | 60/261 |
| 3,315,468 | 4/1967 | Vdoviak | 60/749 |
| 3,557,402 | 1/1971 | Koehl | 411/521 X |
| 3,901,622 | 8/1975 | Ricketts | 415/214 X |
| 4,281,941 | 8/1981 | Rottenkolber | 403/404 X |
| 4,312,599 | 1/1982 | Darolia | 403/29 |
| 4,381,801 | 5/1983 | Brunner | 138/148 |

Primary Examiner—Louis J. Casaregola
Assistant Examiner—Timothy S. Thorpe
Attorney, Agent, or Firm—Francis L. Conte; Derek P. Lawrence

[57] ABSTRACT

A scroll-wound metallic cushioning bushing in a bore in a ceramic part permits pin-type connection between the ceramic part and a surrounding metal structure while cushioning against vibration and differential thermal loading which may otherwise destroy the relatively brittle ceramic material. In one embodiment, a scroll-wound cushioning bushing is employed in a trip baffle in a flameholder of an afterburner diffuser section wherein the pins holding the trip step in place are surrounded by the ceramic material and thus protected from the extreme heat found in a flameholder. In another embodiment of the invention, a large ceramic part is supported on a plurality of pins each passing through a cushioned bushing assembly which permits not only radial relative motion of pins and ceramic part, but also permits limited axial displacement and twisting.

17 Claims, 7 Drawing Figures

FIG.3
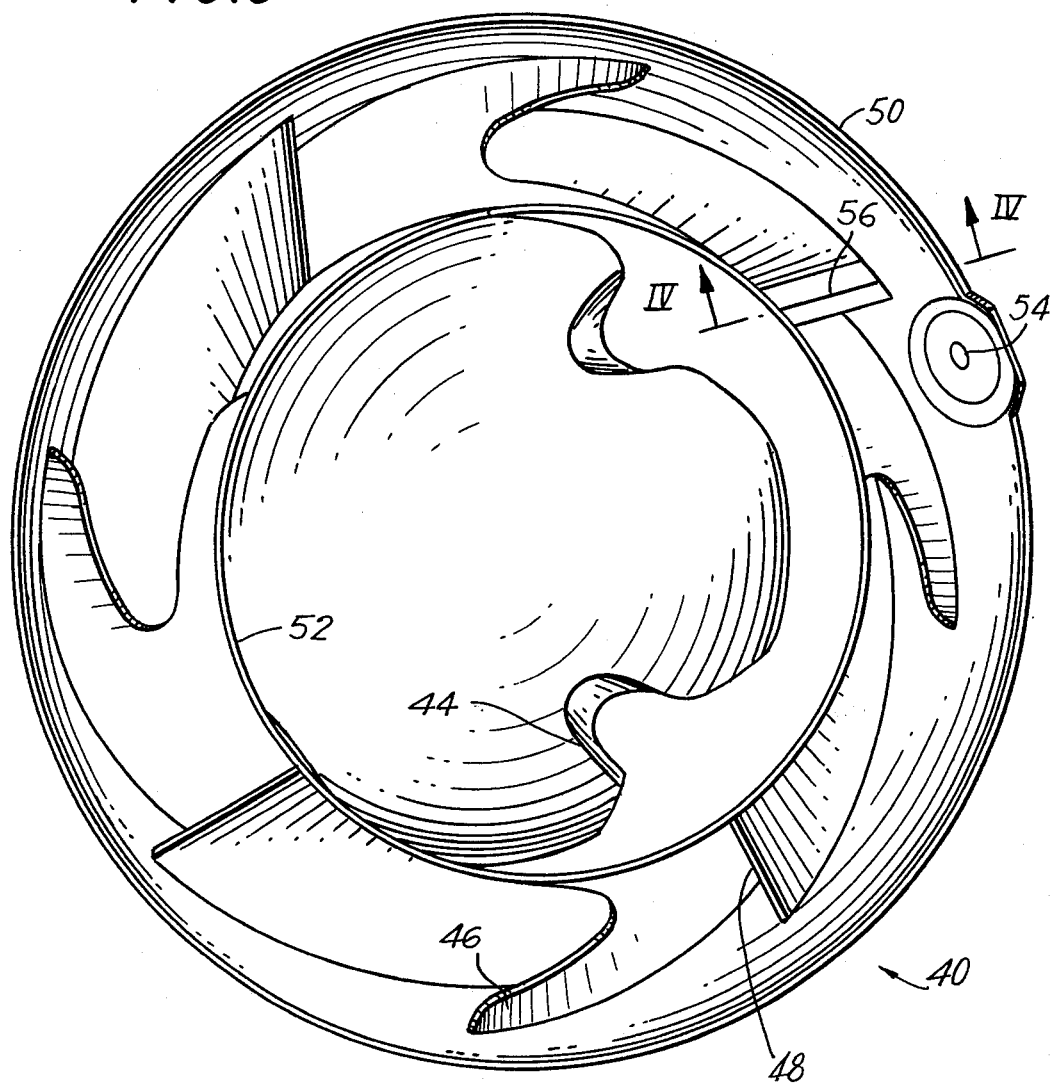
FIG.4
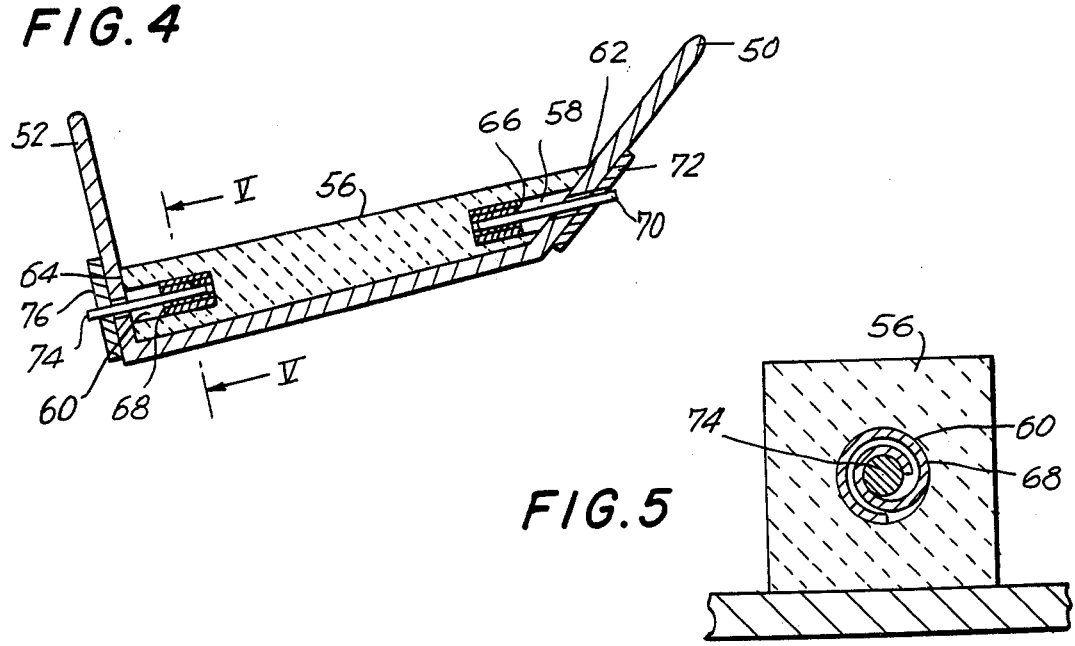
FIG.5

APPARATUS FOR ATTACHING A CERAMIC MEMBER TO A METAL STRUCTURE

The Government has rights in this invention pursuant to Contract No. F41608-80-C-A201 awarded by the U.S. Department of the Air Force.

BACKGROUND OF THE INVENTION

The present invention relates to attachment devices and, more particularly, to high temperature attachment devices for attaching ceramic to metal parts in a high temperature environment such as, for example, in a jet engine.

The efficiency of jet engines can be increased by increasing the operating temperature of gases therein. Such operating temperature has been limited by the ability of materials to withstand such high temperature. Metals tend to soften, flow and burn as temperatures become higher.

It is well known that certain ceramic materials are capable of withstanding higher temperatures than are metals. Although this desirable property has been known for some time, the use of ceramic materials in jet engines has been limited. High temperature ceramic materials tend to be brittle and thus tend to fracture under mechanical stress. Thus, its use in high load bearing and rotating parts has not been favored.

In some of the highest temperature locations such as, for example, in an afterburner diffuser of a military jet engine, the use of certain stationary ceramic parts would be desirable. However, it has been difficult to attach such stationary ceramic parts to the surrounding metal parts in a way which would provide the necessary cushioning to absorb vibrational shock and differential thermal loading at the points of attachment of the ceramic parts to the surrounding metal structure.

Metal clips for holding the ceramic parts in a truly high temperature environment tend to burn and melt away even when made of high temperature metal. Another possibility includes driving pins into holes formed in the ceramic parts. However, problems have been encountered in the development of satisfactory methods for cushioning the ceramic against damage from transmission of mechanical vibrations through the pin to the ceramic and for preventing damage due to differential thermal loading.

OBJECTS AND SUMMARY OF THE INVENTION

Accordingly, it is an object of the present invention to provide means for attachment of ceramic to metal parts which avoid the drawbacks of the prior art.

It is a further object of the present invention to provide means for cushioning a pin in a hole formed in a ceramic bushing wherein the pin provides attachment of the ceramic to metal parts in a high temperature environment It is a further object of the present invention to provide a cushioned bushing for absorbing mechanical vibration and mechanical stresses due to differential thermal loading between a pin and a hole in a ceramic part attached by the pin to a surrounding metal structure.

It is a still further object of the invention to provide a cushioned bushing for cushioning a pin in a hole in a ceramic part wherein the cushioned bushing is scroll wound and completes in excess of one and one quarter complete revolutions to form a cylindrical cushioned bushing the outside surface of which bears against the hole in the ceramic part, and the inside surface of which bears against the outer surface of a metallic pin.

According to one embodiment of the present invention, there is provided an apparatus for mounting a ceramic member to a metallic structure in a thermally cyclic environment, comprising at least one bore in the ceramic member, at least one metallic pin passing through the metallic structure and into the at least one bore, a scroll-wound metal bushing between each of the metallic pins and each of the bores, and each of the metal bushings being formed of a metal sheet scroll wound at least one and one quarter turns to provide at least one quarter turn overlap.

According to another embodiment of the present invention, there is provided and apparatus for mounting a ceramic trip baffle to a flameholder in an afterburner diffuser section of an afterburning jet engine. The apparatus comprises the flameholder having first and second sides, the ceramic trip baffle having first and second ends fitting substantially tightly to the first and second sides respectively, first and second bores in the first and second ends respectively, first and second scroll-wound metallic cushioning bushings having at least 1.25 turns in the first and second bores respectively. Each of the first and second scroll-wound metallic cushioning bushings includes an outer substantially cylindrical perimeter engaging its respective bore and a substantially cylindrical inner perimeter. First and second pins pass through the first and second sides respectively and engage the substantially cylindrical inner perimeters in the first and second bushings respectively, whereby the first and second pins are substantially protected from heat in the flameholder by the ceramic trip baffle substantially completely surrounding them.

According to another embodiment of the invention, there is provided an apparatus for mounting a ceramic annular V-ring in a cascade flameholder comprising a plurality of tangentially spaced-apart radial bores in the V-ring, each of the radial bores having a cushioned bushing assembly therein. Each of the cushioned bushing assemblies includes a cylindrical hard bushing passing through the bore and having an axial bore therein, a scroll-wound metallic bushing having at least 1.25 turns between the hard bushing and the bore, first and second washers rigidly affixed at opposed ends of the hard bushing and effective to retain the hard bushing in the bore. The bushing assembly also includes at least one slip washer between each of the first and second washers and a surface of the V-ring, a plurality of radially directed pins each passing slidably through an axial bore of one of the hard bushings, means at a first end of each of the pins for rigidly affixing it to the flameholder, and means at a second end of each of the pins for slidably supporting the second end in the flameholder.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is a rear view of a flameholder of FIG. 2 showing a ceramic trip baffle installed with a cushioned bushing according to the present invention.

FIG. 4 is a cross section of the trip baffle taken along IV—IV of FIG. 3.

FIG. 5 is a cross section of the trip baffle taken along V—V of FIG. 4.

DETAILED DESCRIPTION OF THE PREFERRED EMBODIMENT

Although the following description of a high temperature cushioned bushing is cast in the environment of a flameholder of an afterburner jet engine, the scope of the invention should not be considered to be limited to such an environment.

Figure 1:
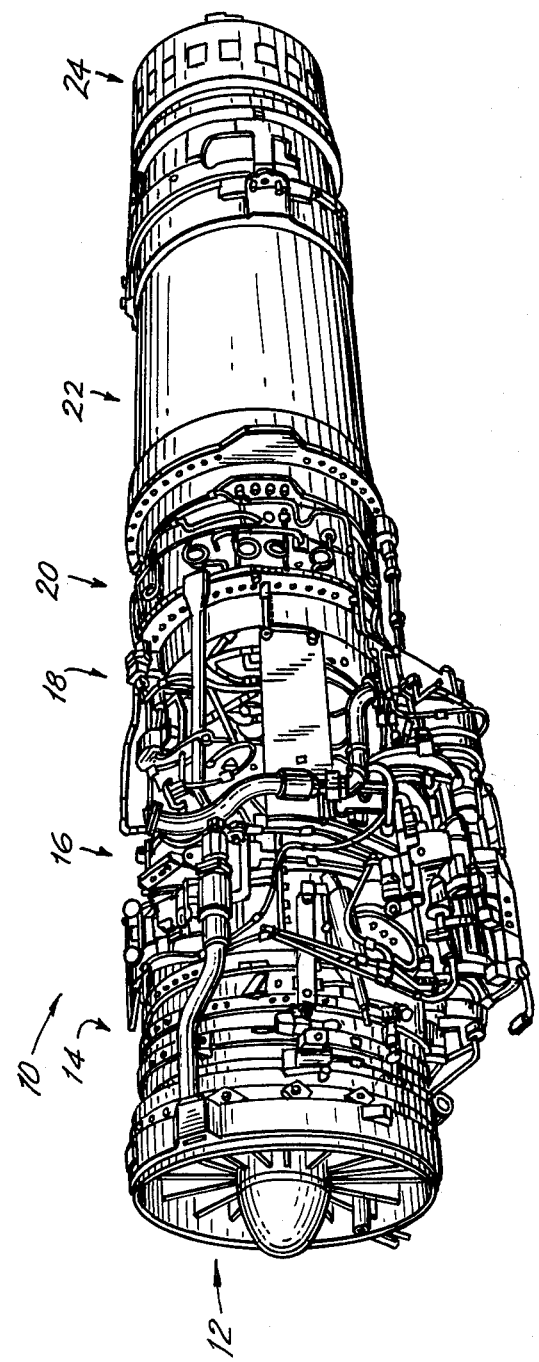
FIG. 1 is a perspective view of an afterburning jet engine in which a cushioned bushing according to an embodiment of the present invention may be employed.

Referring to FIG. 1, there is shown, generally at 10, an afterburner jet engine of a type usable in a military aircraft. Jet engine 10 includes an intake section 12 through which air enters, a compressor section 14 in which the air is compressed, a combustion chamber section 16 in which the compressed air is mixed with fuel and burned to provide energy, a turbine section 18 wherein the hot gas flowing from the combustion chamber energizes the turbine which is employed to drive the compressor and accessories. Downstream of the turbine the engine includes an afterburner diffuser section 20 in which fresh fuel may be added to the hot has outflow from turbine section 18 to provide a burst of power, an afterburner section 22 in which fuel added in afterburner diffuser section burns with excess air in the exhaust from turbine section 18 to further boost the energy of the gases and, finally, a nozzle section 24 which, particularly in military aircraft, may be of variable geometry.

Due to the extremely high temperatures to which materials in afterburner diffuser section 20 may be exposed, as well as high vibration conditions which may be experienced in this location, this section is a good candidate for the use of high temperature ceramic parts secured to the surrounding metal structure using high temperature cushioned bushings according to an embodiment of the present invention.

Figure 2:
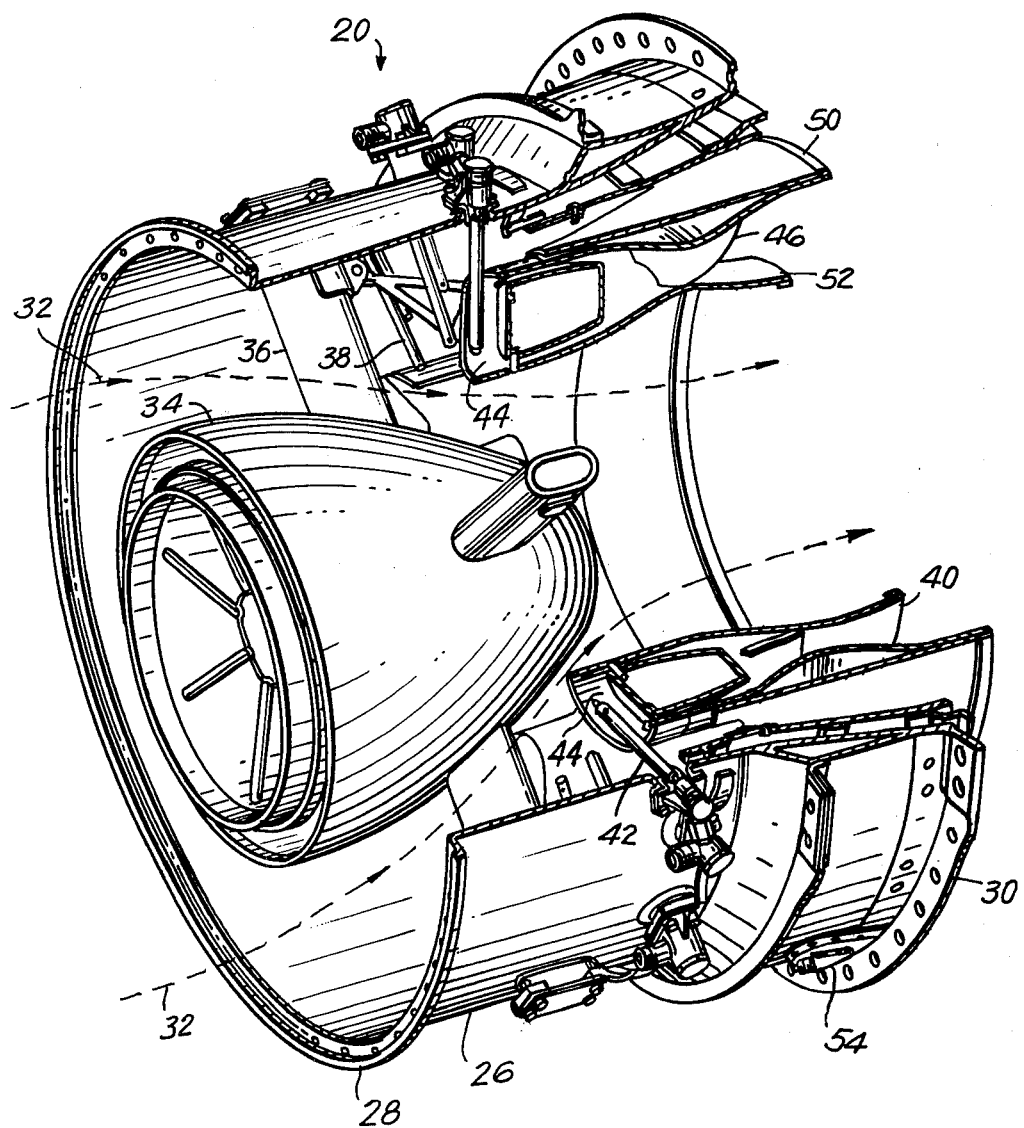
FIG. 2 is a perspective view of the afterburner diffuser section of the jet engine of FIG. 1 partially cut away to show internal components.

Referring now to FIG. 2, there is shown an afterburner diffuser section 20 separated from the remainder of jet engine 10 and partially cut away to show internal components. An afterburner diffuser section casing 26 includes a fiange 28 on the forward portion thereof for mating with a corresponding flange (not shown) at the aft end of turbine section 18. A second flange 30 at the aft end of casing 26 is employed for attachment of afterburner section 22 (FIG. 1).

As is well known to those skilled in the art, hot gases exit turbine section 18 in an annular flow and enter afterburner diffuser section 20 in the same manner as indicated by flow arrows 32. An inner diffusing cone 34, supported on struts 36 guides the annular flow of gas into a solid outflow from afterburner diffuser section 20.

A plurality, preferably 16, of main spray bars 38, are disposed extending inward around the perimeter of casing 26. When the afterburner is used, main spray bars 38 add atomized fuel to the hot gas and unreacted air as they pass inner diffusing cone 34.

It is not sufficient to merely ingnite the newly injected fuel and air mixture. The location of the flame front must be controlled so that satisfactory combustion of the fuel will be accomplished in afterburner section 22 (FIG. 1). In addition, it is possible that a flame once started can be expelled from afterburner section 22 by the rapid gas flow. Accordingly, a flameholder 40 is provided which creates and retains a ring of flame surrounding the main flow indicated by flow arrows 32. The flame in flameholder 40 ignites the fuel mixture passing through the center thereof and thus stabilizes the flame front in its optimum position.

A plurality, suitably 4 pilot spray bars 42 are disposed in respective inlet ducts 44 of flameholder 40. A portion of the main flow of exhaust gas enters inlet ducts 44, receives atomized fuel from pilot spray bar 42 and is guided by a plurality of vanes 46 into a circumferential whirling trajectory.

Referring now also to FIG. 3, at the aft end of flameholder 40, exit apertures 48 formed by vanes 46 are shown. The aft face of flameholder 40 is bluff and is bounded by an outer perimeter 50 and an inner perimeter 52. The cross sectional shape of the aft end of flameholder 40 can be roughly compared to the shape of a shallow Vee into which exit aperatures 48 feed the mixture of fuel and gas which entered inlet ducts 44. This mixture tends to whirl about in the bluff aft face of flameholder 40.

An igniter 54 is disposed in the roughly V-shaped channel of the bluff end where it is in a position to ignite the fuel mixture as it whirls therepast.

In order to increase the mixing and turbulence of the fuel mixture just before it reaches igniter 54, a trip baffle 56 is positioned in the V-shaped cavity just upstream of igniter 54. Trip baffle 56 provides a bluff leading and trailing edge in the direction of flow of the fuel mixture. Due to the turbulence to which trip baffle 56 is exposed and also to the fact that it is a small part having limited ability to discharge heat into the surrounding structure by conduction, trip baffle 56 has been a maintenance problem in jet engines.

According to the present invention, trip baffle 56 is formed of a high temperature ceramic material.

Referring now to FIG. 4, trip baffle 56 is seen to contain first and second bores 58 and 60 in ends 62 and 64 thereof which abut outer and inner perimeters 50 and 52, respectively. A scroll-shaped cushioning bushing 66 is disposed in bore 58. Likewise, a scroll-shaped cushioning bushing 68 is disposed in bore 60. A pin 70 passes through a washer 72 affixed to outer perimeter 50 and enters cushioning bushing 66. Washer 72 is welded to the pin 70 and to the shell 50.

A pin 74 passes through a washer 76 on inner perimeter 52 and into cushioning bushing 68 and is similarly welded.

It should be noted that the method of mounting ceramic trip baffle 56 surrounds the portions of pins 70 and 74 between inner and outer perimeters 52 and 50 with ceramic material and thus protects them from exposure and damage due to the high temperature gases circulating in flameholder 40.

Referring now to FIG. 5, cushioning bushing 68 (as well as cushioning bushing 66) is seen to be a scroll-wound cylindrical bushing. The overlapping portions of the turns of cushioning bushing 68 provide the necessary cushioning as well as resilience for firmly securing pin 74 therein but, at the same time, preventing excessive outward force or the transmission of excessive vibration to bore 60 in the ceramic material of trip baffle 56. Although the applicant has no intention of being limited by a particular theory, the resilience and firmness may be produced by any one or a combination of the following effects: friction between surfaces of adjacent turns, oxide on the surfaces of the metal, gas between the surfaces, surface roughness on the material or springback of the material.

Cushioning bushings 66 and 68 are preferably made of a high temperature material such as, for example, AMS 5537, also identified as L605 which is a high temperature alloy consisting of 45 percent cobalt, less than 3 percent iron with the remainder made up of nickel, tungsten and chromium. Another suitable high temperature alloy may be Rene 41 which consists of 19 percent chromium, 11 percent cobalt, 5 percent iron, 10 percent molybdenum, 3 percent titanium, 1.5 percent aluminum and the remainder being nickel. Other metals having suitable strength, malleability, resilience and temperature resistance may also be used.

Cushioning bushings 66 and 68 may be formed by wrapping a sheet of the appropriate metal about a mandrel having a suitable diameter to form the required number of turns. Cushioning bushings 66 and 68 should be comprised of more than one turn so that an overlap is provided between facing surfaces. In one advantageous embodiment, cushioning bushings 66 and 68 have from about 1.25 to about 2.25 turns. A greater number of turns can be employed limited only by the amount of cushioning desired. Satisfactory performance has been achieved with 2.25 turns of 0.005 inch material wrapped tightly around an appropriately sized mandrel so that the final outside and inside diameters are suitable after springback for fitting bores 58 and 60 as well as pins 70 and 74 (FIG. 4).

Figure 6:
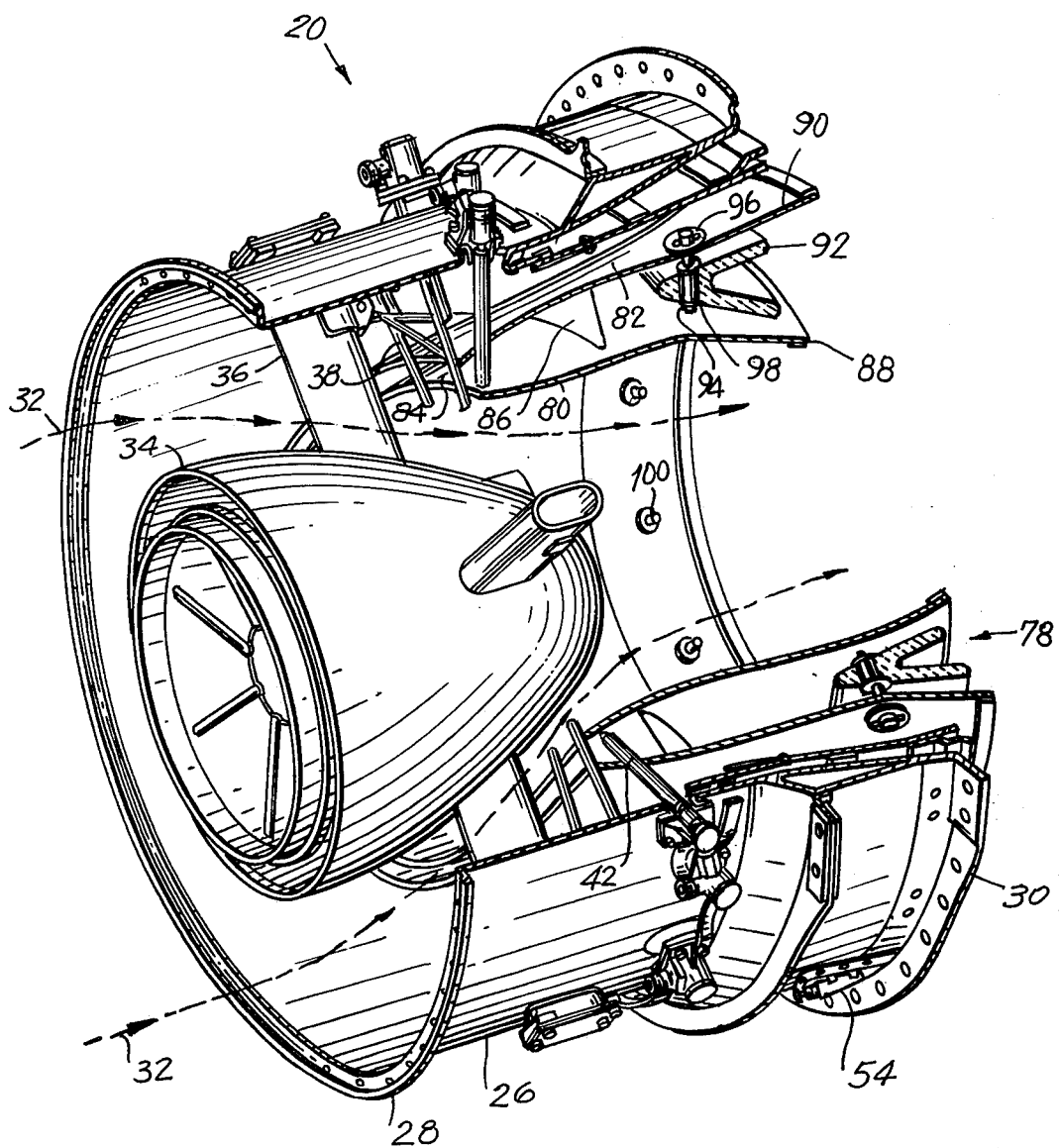
FIG. 6 is a perspective view of an afterburner diffuser section having a cascade flameholder including a ceramic annular ring mounted therein using a cushioned bushing assembly according to an embodiment of the present invention.

Referring now to FIG. 6, there is shown an environment for a further application of the cushioned bushing of the present invention. The apparatus shown is an alternate flameholder construction from that shown in FIG. 2. A cascade flameholder 78 includes an inner wall 80 and an outer wall 82 providing an annular entry mouth 84 for entry of exhaust gas and unreacted air diverted from flow 32. A plurality of curved blades or vanes 86 affixed between inner and outer walls 80 and 82 impart rotary motion to the gas to which fuel has been added by pilot spray bars 42. Exit portions 88 and 90 are flared outward to provide a trumpet-shaped cross section to inner and outer walls 80 and 82, respectively. An annular ring 92 of ceramic material is supported between exit portions 88 and 90 to divide the flow of gas from curved vanes 86. Annular ring 92 has a V-shaped cross section in which the downstream spread of the legs may be on the order of 1.5 inches. The overall diameter of annular ring 92 may be on the order of 12 to 13 inches. Support of such a large structure in a cyclic thermal invironment such as, for example, in the flameholder of a jet engine has been difficult, if not impossible, to achieve by conventional methods.

In the past, ceramic parts such as annular ring 92 have been bolted in place or have been cemented to bushings which were, in turn, bolted in place. In a cyclic high temperature environment, the growth of surrounding engine parts has been sufficient to pull the ceramic apart. Furthermore, such firm holding of ceramic parts in a metal structure has encouraged not only the transmission of vibration, but also has permitted resonance peaks of the combined ceramic/metal structure to grow undamped to destructive levels.

In an embodiment of the present invention, annular ring 92 is centrally supported between exit portions 88 and 90 by a plurality of pins 94 passing through fittings 96 in exit portion 90, cushioned bushing assemblies 98 and fittings 100 in exit portion 88.

The downstream edges of annular ring 92 are recessed slightly into exit portions 88 and 90. Due to turbulence partly provided by the action of curved vanes 86 and also by the passage of the gases past the bluff downstream end of the V-shaped annular ring 92, the gases and fuel form inward vortices as they pass the bluff downstream end of annular ring 92 giving further mixing. This region across the entire downstream end of annular ring 92 and extending across the extremities of exit portions 88 and 90 remains ignited for the maintenance of a stable flame front in the main gas and fuel flow 32.

Since the flame in flameholder 78 is downstream of the suspension points on pins 94, pins 94 are not exposed to the same extreme heat as was the case in the embodiment of the invention used in supporting trip baffle 56 shown and described in connection with FIGS. 1–5. Consequently, the embodiment of FIG. 6 does not require embedding pins 94 within ceramic.

Figure 7:
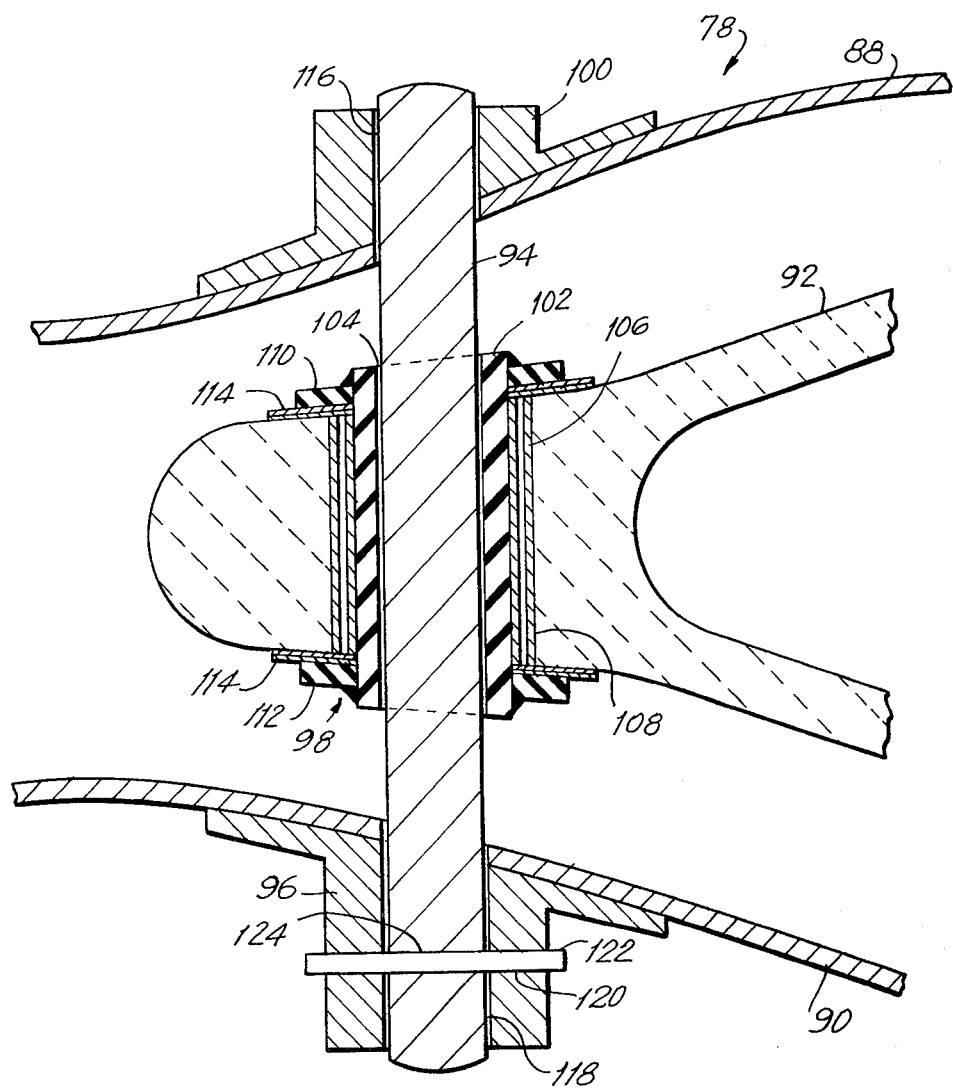
FIG. 7 is an enlarged fractional cross section taken axially through a mounting pin mounting the annular ring of FIG. 6.

Referring to FIG. 7, cushioned bushing assembly 98 is seen to include a hard bushing 102 of steel or a high temperature alloy having an axial bore 104 therethrough through which pin 94 is inserted. A scroll-shaped cushioned bushing 106 is fitted within a cylindrical bore 108 near the apex of V-shaped annular ring 92. Hard bushing 102 passes through the axis of cushioned bushing 106. First and second washers 110 and 112 are rigidly affixed to hard bushing 102 at opposed sides of bore 108 by any convenient means such as by welding. At least one, and preferably two slip washers 114 are disposed between washers 110 and 112 and the opposed surfaces of annular ring 92.

Fitting 100 includes a bore 116 therein through which an end of pin 94 passes. Fitting 96 also includes a bore 118 for accommodating pin 94 as well as a transverse bore 120 for accommodating a locking pin 122 which also passes through a transverse bore 124 in pin 94.

Flameholder 78 substantially expands and contracts radially during thermal cycling. Pins 94 are directed along radii and are consequently directed along the direction of growth and shrinkage of the structure. Pins 94, being rigidly affixed to flameholder 78 at only one end by locking pin 122, are free to move in bore 116 of fitting 100 as required to accommodate the changing dimensions during thermal cycling. In addition, since axial bore 104 of hard bushing 102 is slidably disposed on pin 94, annular ring 92 is free to move in the radial direction relative thereto.

As previously explained, cushioned bushing 106 cushions hard bushing 102 in bore 108 of annular ring 92. That is, cushioned bushing 106 permits a certain amount of relative motion between these parts to cushion against vibration, etc. Slip washers 114 permit this relative motion.

In addition to the function of slip washers 114 for permitting motion, slip washers 114, in combination with cushioned bushing 106 tend to dampen vibration and thus prevent the buildup of resonance peaks of the ceramic/metal structure and thus avoid structural damage to the ceramic.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for mounting a ceramic member to a metallic structure in a thermally cyclic environment, comprising:
    at least one bore in said ceramic member;
    at least one metallic pin passing through said metallic structure and into said at least one bore;
    a scroll-wound metal bushing between each of said metallic pins and each of said bores; and
    each of said metal bushings being formed of a metal sheet scroll wound at least one and one quarter turns to provide at least one quarter turn overlap, overlapping portions of said bushing being spaced from each other for resiliently accommodating differential thermal loading of said ceramic member and said metallic structure.

2. Apparatus according to claim 1, wherein said metallic structure is a metallic flameholder in an afterburner jet engine, said ceramic member is a ceramic trip baffle having first and second opposed ends tightly fitted respectively to first and second surfaces of said flameholder, said at least one bore includes a first bore in said first end and a second bore in said second end, said at least one metallic pin being first and second metallic pins passing respectively through said first and second surfaces into said first and second bores, said at least one metal bushing being a first metallic bushing between said first metallic pin and said first bore and a second metallic bushing between said second pin and said second bore, said first and second metallic pins being substantially protected from hot gas in said flameholder by being surrounded by said ceramic member.

3. Apparatus according to claim 1, wherein said metallic structure is an afterburner diffuser including a cascade flameholder having a ceramic annular ring mounted therein, said at least one bore including a plurality of tangentially spaced-apart bores radially disposed in said annular ring, said at least one metallic pin including one pin passing through each of said plurality of spaced-apart bores and cushioned from said annular ring by one of said scroll-wound metal bushings, opposed ends of each of said pins being supported in said flameholder.

4. Apparatus according to claim 3, further comprising a hard bushing between each of said scroll-wound metal bushings and its respective pin, said hard bushing permitting radial motion of said pin with respect thereto.

5. Apparatus according to claim 4, further comprising first and second washers rigidly affixed to opposed ends of each of said hard bushings and effective to retain said hard bushing within said bore, and at least one slip washer between each of said washers and a surface of said annular ring whereby relative motion of said annular ring transverse to said pin is enabled.

6. Apparatus according to claim 5, further comprising means for rigidly fixing each of said pins to said flameholder at only a first end thereof, a second end of each of said pins being slidably retained to said flameholder.

7. Apparatus for mounting a ceramic trip baffle to a flameholder in an afterburner diffuser section of an afterburner jet engine, comprising:
    said flameholder having first and second sides;
    said ceramic trip baffle having first and second ends fitting substantially tightly to said first and second sides respectively;
    first and second bores in said first and second ends respectively;
    first and second scroll-wound metallic cushioning bushings having at least 1.25 turns in said first and second bores respectively, overlapping portions of said bushing being spaced from each other for resiliently accommodating differential thermal loading of said ceramic member and said metallic structure;
    each of said first and second scroll-wound metallic cushioning bushings including an outer substantially cylindrical perimeter engaging its respective bore and a substantially cylindrical inner perimeter; and
    first and second pins passing through said first and second sides respectively and engaging said substantially cylindrical inner perimeters in said first and second bushings respectively, whereby said first and second pins are substantially protected from heat in said flameholder by said ceramic trip baffle substantially completely surrounding them.

8. Apparatus for mounting a ceramic annular V-ring in a cascade flameholder comprising:
    a plurality of tangentially spaced-apart radial bores in said V-ring;
    each of said radial bores having a cushioned bushing assembly therein;
    each of said cushioned bushing assemblies including a cylindrical hard bushing passing through said bore and having an axial bore therein, a scroll-wound metallic bushing having at least 1.25 turns between said hard bushing and said bore, overlapping portions of said bushing being spaced from each other for resiliently accommodating differential thermal loading of said ceramic member and said metallic structure, first and second washers rigidly affixed at opposed ends of said hard bushing and effective to retain said hard bushing in said bore, at least one slip washer between each of said first and second washers and a surface of said V-ring;
    a plurality of radially directed pins each passing slidably through an axial bore of one of said hard bushings;
    means at a first end of each of said pins for rigidly affixing it to said flameholder; and
    means at a second end of each of said pins for slidably supporting said second end in said flameholder.

9. An apparatus for mounting a first member to a second member comprising:
    a bore disposed in said first member;
    a pin extending from said second member and into said bore disposed in said first member;
    a scroll-wound bushing disposed circumferentially around said pin and in said bore, said bushing including at least 1.25 turns, overlapping portions of said bushing being spaced from each other for resiliently accommodating differential thermal loading of said first and second members.

10. A mounting apparatus according to claim 9 wherein said scroll-wound bushing includes an outer surface which bears against said bore in said first member and an inside surface which bears against an outer surface of said pin.

11. A mounting apparatus according to claim 9 wherein said bushing includes 2.25 turns.

12. A mounting apparatus according to claim 9 wherein said first member is a ceramic member and said second member is a metallic member.

13. A mounting apparatus according to claim 9 further including a cylindrical bushing disposed between said pin and said scroll-wound bushing and coaxial therewith.

14. A mounting apparatus according to claim 13 further including a first washer rigidly secured transversely with a first end of said cylindrical bushing, said first washer having an outer diameter larger than an outer diameter of said bore so that said first washer overlaps said first member.

15. A mounting apparatus according to claim 14 wherein said bore and said cylindrical bushing extend through said first member and said apparatus further includes a second washer rigidly secured transversely with a second, opposite end of said cylindrical bushing, said second washer having an outer diameter greater than said outer diameter of said bore, said first and said second washers being effective for retaining said cylindrical bushing in said bore.

16. A mounting apparatus according to claim 15 further including a slip washer disposed between said first washer and said first member.

17. A mounting apparatus according to claim 15 further including a plurality of coaxial slip washers disposed between said first washer and said first member.

* * * * *